United States Patent
Pantenburg et al.

(10) Patent No.: US 7,096,165 B2
(45) Date of Patent: Aug. 22, 2006

(54) METHOD FOR CONFIGURING AN ELECTRICAL INSTALLATION AND CORRESPONDING CONFIGURATION DEVICE

(75) Inventors: Norbert Pantenburg, Nuremberg (DE); Thomas-M Stutzer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 711 days.

(21) Appl. No.: 10/130,216

(22) PCT Filed: Mar. 2, 2001

(86) PCT No.: PCT/DE01/00795
§ 371 (c)(1),
(2), (4) Date: May 14, 2002

(87) PCT Pub. No.: WO01/69751

PCT Pub. Date: Sep. 20, 2001

(65) Prior Publication Data

US 2004/0049772 A1    Mar. 11, 2004

(30) Foreign Application Priority Data

Mar. 17, 2000  (DE) ................................. 100 13 037

(51) Int. Cl.
*G06F 17/50*   (2006.01)
*G06F 7/54*   (2006.01)

(52) U.S. Cl. ............................................ 703/1; 703/18

(58) Field of Classification Search ..................... 703/1; 361/91.1, 62
See application file for complete search history.

(56) References Cited

U.S. PATENT DOCUMENTS

| | | | | |
|---|---|---|---|---|
| 4,747,061 A | * | 5/1988 | Lagree et al. | 700/298 |
| 5,218,307 A | * | 6/1993 | Hiller | 324/541 |
| 5,351,165 A | * | 9/1994 | Hancock | 361/637 |
| 5,675,194 A | * | 10/1997 | Domigan | 307/147 |
| 5,872,722 A | * | 2/1999 | Oravetz et al. | 700/292 |
| 6,249,516 B1 | * | 6/2001 | Brownrigg et al. | 370/338 |
| 6,901,439 B1 | * | 5/2005 | Bonasia et al. | 709/220 |

FOREIGN PATENT DOCUMENTS

| | | |
|---|---|---|
| DE | 42 09 168 A1 | 9/1993 |
| DE | 195 19 755 A1 | 4/1996 |
| DE | 196 39 424 A1 | 3/1997 |
| GB | 2 294 340 A | 4/1996 |
| WO | WO 97/15877 | 3/1997 |
| WO | WO 98/48364 | 10/1998 |

* cited by examiner

*Primary Examiner*—Paul L. Rodriguez
*Assistant Examiner*—Andre Pierre-Louis
(74) *Attorney, Agent, or Firm*—Harness, Dickey & Pierce, P.L.C.

(57) ABSTRACT

A network map is determined, either in the operating direction from the feed circuit to the load in the load circuit, or backward on the basis of the loads in the load circuit to the data for the feed circuit. The feed circuit and the load circuit are coupled to a virtual interface, at which secondary distribution panels can be interconnected. The schematic procedure, in conjunction with appropriate computation rules and visualization in a network map that is obtained, allows the configuration process to be carried out even by those who are unskilled.

17 Claims, 10 Drawing Sheets

| Load circuit | | ☒ |
|---|---|---|
| Designation | NSHV-1A | ... |
| Network system/ground connection | TN-C | |
| Type of switching device | Circuit breaker | ... |
| Designation | NS-LS 1A.1 s | |
| In [A] Icu [kA] | 400.0/45.0 | |
| Current transformer primary | 50.0 | |
| Type of switching device | Cable | ... |
| Designation | Cable 1A.1 | |
| Length [m] | 300.0 | |
| Arrangement | Multiple conductor | |
| Cross section outer/PE conductor | 150.0/150.0 | |
| Iz [A] | 636 | |
| Type of switching device | None | ... |
| Designation | | |
| In [A] Icu [kA] | | |
| Current transformer primary | | |
| Designation | Fixed load 1A.2 | ... |
| Type of load | Fixed load | |
| Network system/ground connection | TN-C | |
| Sum Ib x ai [A] | 0 | |

OK  Cancel  ?

FIG 3

| Cable | ☒ |
|---|---|
| ☑ Dimension automatically | |

| | |
|---|---|
| Designation | Cable 1A.2.1 |
| Conductor material | Cu |
| Insulating material | PVC70 |
| Quantity | 1 |
| Cross section outer conductor | 16.0 |
| Cross section pen conductors | 16.0 |
| Arrangement | Multiple conductor |
| Type of laying | A1 |
| Conversion factor $f_{tot}$ | 1.0 |
| Max. permissible voltage drop per field [%] | 4.0 |

Type of laying ?
$f_{tot}$ ?

OK | Cancel | ?

FIG 4

METHOD FOR CONFIGURING AN ELECTRICAL INSTALLATION AND CORRESPONDING CONFIGURATION DEVICE

This application is the national phase under 35 U.S.C. § 371 of PCT International Application No. PCT/DE01/00795 which has an International filing date of Mar. 2, 2001, which designated the United States of America, the entire contents of which are hereby incorporated by reference.

FIELD OF THE INVENTION

The invention generally relates to a method for configuring an electrical installation with a network, preferably one which extends from a feed side to a load side. The invention also generally relates to a configuration apparatus for carrying out the method.

BACKGROUND OF THE INVENTION

DE 42 09 168 C2 discloses a computer-aided configuration method, which is used for configuring an automation device for a switchgear assembly. The method described there includes all the steps relating to the planning and setting of the automation device. These include, for example, configuration, engineering, the production of documentation systems, the configuration of a remote control point, the generation of operating data for the automation device and the production of technical documents, circuit diagrams, screen layouts, equipment lists, prices and other technical data.

In this case, a model of the installation to be configured is produced from a modular program, based on a data pool of information relating to standard circuits and standard appliances. Inclusion of the switchgear assembly or primary installation to be controlled is not considered.

The process of configuring an electrical installation, for example for the electrical power supply for a building, involves a large number of steps. In this case, it is particularly problematic to select the respective equipment optimally with regard to the various design options, regulations and other boundary conditions. A simple selection mode is not sufficient.

SUMMARY OF THE INVENTION

An embodiment of the invention is based on an object of providing an automated method which, taking account of all the computation rules required for the configuration process, makes it possible to determine and visualize a network map, and for which even those who are unskilled can carry out the configuration process. Furthermore, it is intended to provide a device for carrying out the method.

According to an embodiment of the invention, an object can be achieved by a method for configuring an electrical installation with a network which extends from a feed side to a load side. A network map may be determined by
  determining a feed circuit on the basis of presets for electrical means, the available power and the circuit length, and by
  determining a load circuit on the basis of presets for an intended load and the circuit length or by
  determining a load circuit on the basis of presets for an intended load and the circuit length and by
  determining a feed circuit on the basis of the circuit length and using the results from algorithms and the presets for the load circuit,
  with the feed circuit and the load circuit in each case being coupled to a virtual interface.

This results in a structure which allows a simple network map to be constructed, using standard elements. The fundamental idea in this case is to reduce the network to its essential elements, namely generators and loads.

It is advantageous if a secondary distribution panel can be interconnected at the virtual interface, with an input for the circuit length of the secondary distribution panel being provided for the presets and/or for the results relating to the feed circuit. Any desired network can thus be simulated using simple devices.

The procedure for the method is advantageously that the following processes are carried out for each circuit, as well as for parallel branches in the feed circuit and/or in the load circuit, based on the sum of the loads as far as the circuit under consideration:
  a)—The determination of devices and/or protective measures for obtaining overload safety on the basis of the total load and predetermined tables and algorithms, as well as on the basis of selection tables for establishing suitable appliances;
  b)—the determination of devices and/or protective measures for obtaining short-circuit protection for short-circuit currents which are obtained on the basis of algorithms from the results according to a);
  c)—the determination of devices and/or measures for protection of life against electric shocks in the case of indirect contact, on the basis of the results from a) and b) and on the basis of tables and/or of algorithms,
  d)—the determination of the power cross section and/or of parallel conductors on the basis of the assessment of cable lengths on the basis of the results according to a) to c) from a cable point under consideration to a load under consideration using the consideration measure that a voltage for correct operation of the load is present across the load, on the basis of the voltage drop,
  e)—for the situation where two or more protective devices are provided in series, the determination of devices which have a selective response with respect to one another, on the basis of the results according to a) to d) and on the basis of selection tables, if the protective switching devices have not satisfied the selectivity requirements,
  f)—production of the network map on the basis of the accumulated results according to a) to e).

All the essential dimensioning rules and boundary conditions are thus taken into account, and are satisfied optimally and automatically, consistently and in a standard manner, building on one another.

In this case, it is advantageous if an envelope curve is produced for protective devices which are connected in series upstream or downstream of two or more parallel-arranged protective devices, around the tripping curves of the parallel-arranged protective devices, and these curves are visualized. This results in a clear representation, which allows the operator optimum visual control. In this case, setting parameters for the protective devices can be varied on the basis of values which can be predetermined, and the resultant tripping curves can be visualized online. Small corrections can be implemented immediately in a user-friendly manner—even without any extensive specialist knowledge.

The setting parameters for the protective devices can be provided at an interface for an output to the respective protective devices. Direct data interchange is thus possible, so that there is no need for any additional configuration or setting processes.

The network map is advantageously visualized in the form of a tree structure, which is known in general form from file displays on PCs. The user is thus provided with a generally known representation, which he is already familiar with, so that incorporation is simplified.

The procedure is advantageously such that in order to obtain housings for secondary distribution panels for accommodating determined appliances and devices, it is subdivided into space for main connecting rails, accessories (test equipment, circuit diagram pockets), functional modules for each appliance which can be used, essentially comprising an installation kit, in order to allow a specific appliance to be installed, comprising terminals and, if necessary, intermediate rails, and for the housing.

Then, for determined appliances and devices, the associated determined space can advantageously be subdivided into so-called fields in the form of distribution panels or switchgear cabinets. The entire physical configuration process for the installation is thus carried out automatically, taking into account extensive boundary conditions, such as cabinet dimensions and the heat requirement.

Furthermore, according to an embodiment of the invention, a configuration apparatus is provided for carrying out the method mentioned above, having a computer, a screen, a keyboard and possibly an interface, and having a memory in which a large number of virtual devices, appliances and protective devices are stored with their characteristic data in tables, and having a generator which uses the determined devices, appliances and protective devices to produce the network map. The advantages of the method mentioned above and the following advantages of the method apply in the same sense to the configuration apparatus.

BRIEF DESCRIPTION OF THE DRAWINGS

Exemplary embodiments of the invention, further advantages and details will be explained in more detail in the following text with reference to the drawings, in which:

FIG. 3 shows a screen image for a load circuit,

FIG. 4 shows a screen image for a cable,

DETAILED DESCRIPTION OF THE PREFERRED EMBODIMENTS

Figure 1:
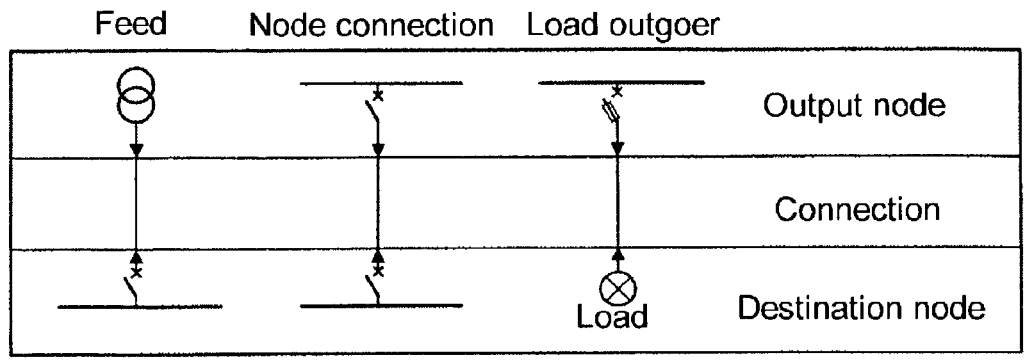
FIG. 1 shows standard elements for designing a network map.

One aim of the configuration method is to carry out the configuration process for the electrical power supply for a building continuously from the building feed to the end user, in accordance with the currently applicable Standards and regulations, on a state-specific basis, quickly and automatically (using a PC), without any specific specialist or equipment knowledge. This is done on the basis of specific deliverable products.

The method can be set up as software or as a program, even a PC or a workstation, and is controlled using a conventional display and controller, and can include input/display devices including but not limited to a display screen, touch screen, keyboard, mouse, etc. Other conventional additional output devices, for example a printer, a plotter, etc. may also be provided, in order to output information.

The configuration of the electrical power supply for a building requires a large number of process steps, in particular the following:

1. Concept production (depending on the nature of the building)
2. Selection of the equipment, such as switching and protective devices, cables, transformers, etc.
3. Definition of the characteristics for setting up, such as laying conditions for cables and lines, allocation of protective devices to equipment, selection of the installation-location-dependent Standards and regulations, etc.
4. Calculation of the load distribution, short-circuit currents, voltage drop, etc. based on the known rules of technology, and production of a selectivity verification.
5. Check as to whether all the state-specific installation and construction regulations have been satisfied.

These steps may take a long time. The configuration process is unclear, since the individual steps and influencing parameters are not independent. This is also documented, since the international committees have so far not been able to agree on any procedure for a common method.

Until now, the configuration process has generally been based on existing installations or on installation parts of projects that have been completed. For this purpose, typical exemplary embodiments are stored and evaluated in paper form, or in the form of EXCEL or ACCESS tables.

This can lead either to a long time being required or to uneconomically dimensioned installations, since an installation designed some time ago and a new project rarely correspond. Furthermore, such a configuration process can be carried out only by specialists.

The generally applicable computation rules for short-circuits, load flow, voltage drop (see also the statements below relating to the configuration method) are stored as a computation core in the sense of standard calculations or formulae. The configuration rules are stored as methods, depending on the types of circuit and the configuration conditions.

Both the parameters for the methods and those for the computation core can be matched to state-specific or user-specific requirements using default settings. State-dependent or user-dependent basic settings thus make it possible to use an expert system to produce an economic configuration, matched to the requirements of the user or of the type of building, without any need for specialist knowledge by the user. The configuration process is carried out automatically in a very short time.

If required, the configuration method can be adapted to specific requirements by specialists or building types, by changing the default values or changing individual equipment items. The user can carry out the configuration process both top-down, that is to say starting from the feed to the individual loads, but also bottom-up, that is to say producing a power budget starting from the loads and going back to the feed.

Structured Procedure (FIG. 1)

In order that even inexperienced users can quickly come to a financially and technically correct result, the procedure has been structured. The aim is to achieve a small number of control steps, which are always the same. In this context, see FIG. 1. The following structures, standard network elements or else basic elements have been defined:

Feed, node connection and load outgoer.

These can each be dealt with using the same scheme:
1. Definition of the initial node (feed, distribution panel). The majority of this is transferred from the previous steps.
2. Definition of the destination node (distribution panel, load).
3. Calculation and dimensioning of the connection (protective function, cable/bus-bar).

Figure 2:
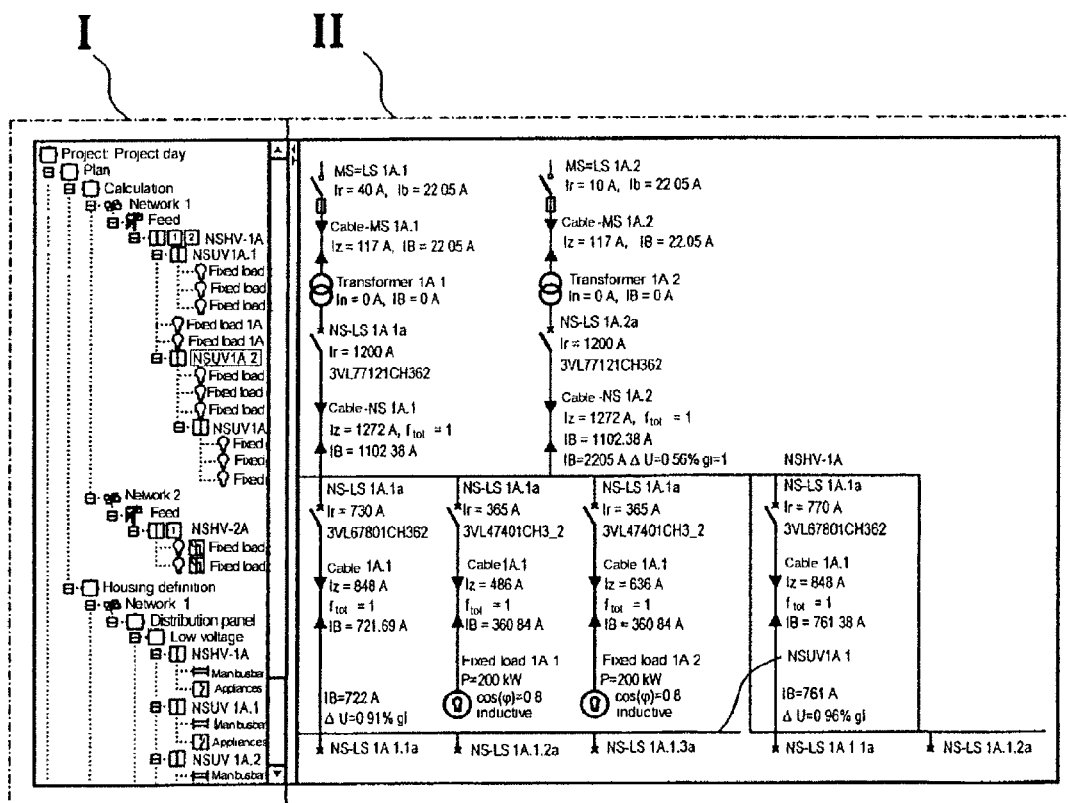
FIGS. 2, 2A and 2B shows a screen display of a network map.
Figure 2A:
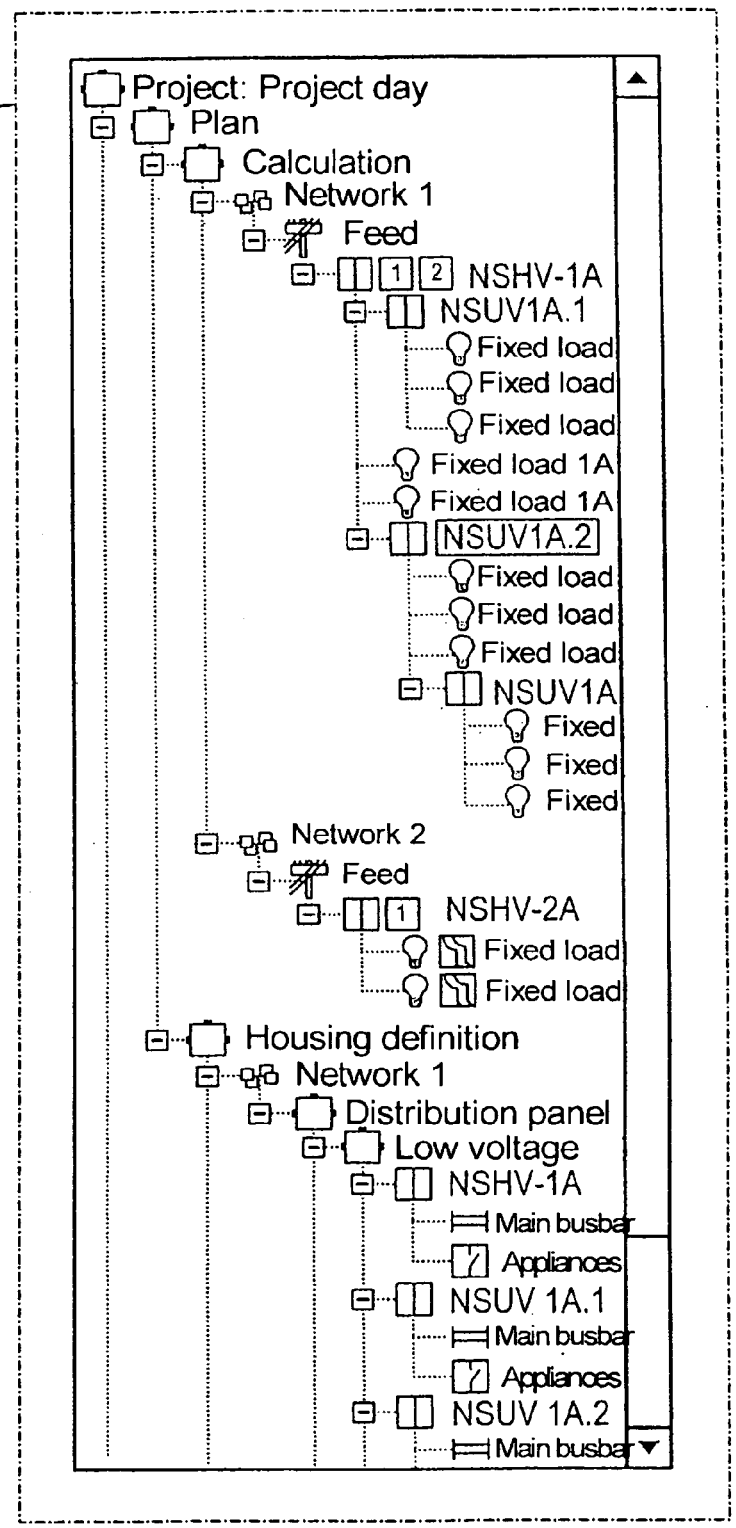
Figure 2B:
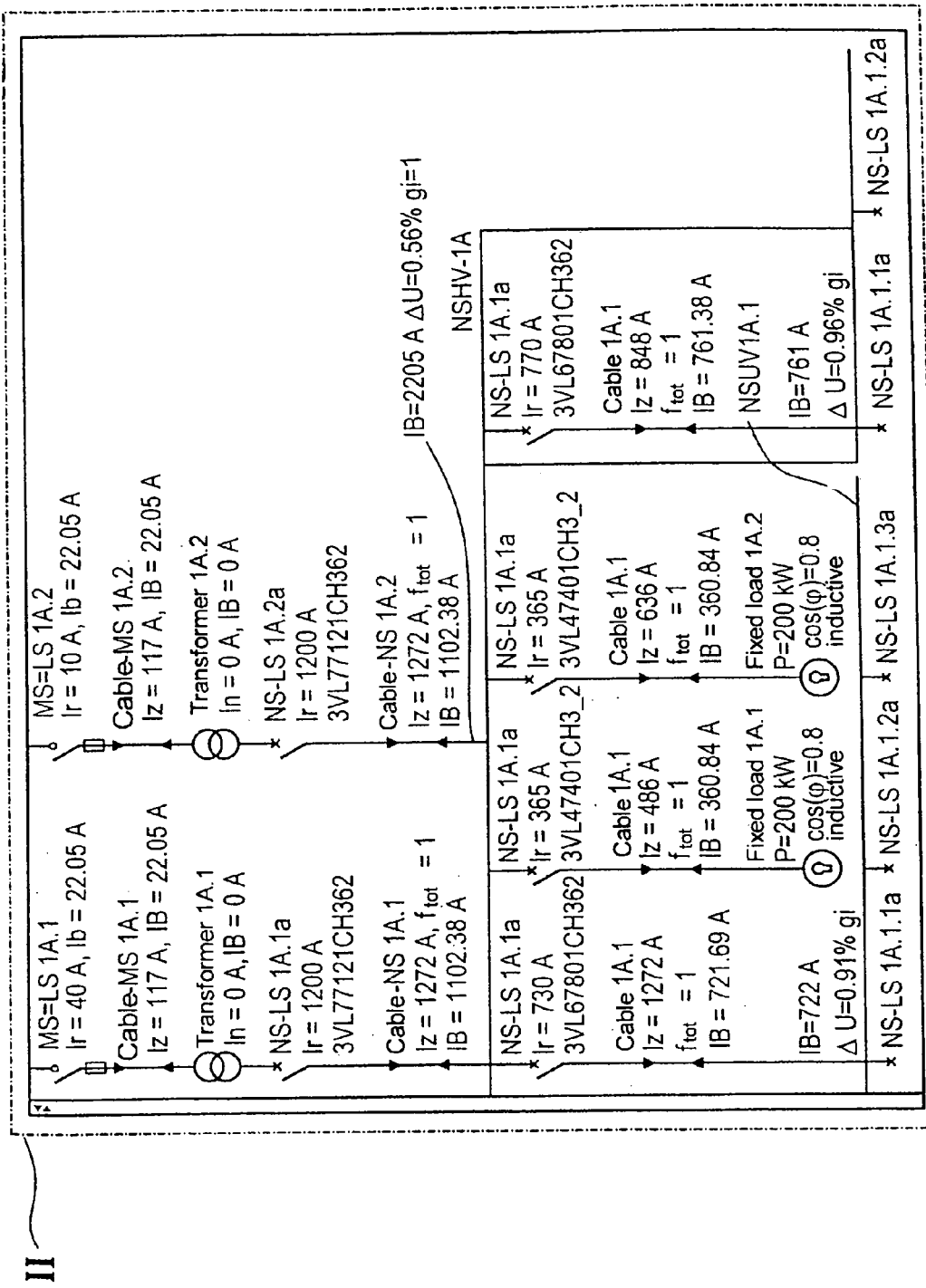

Furthermore, structuring is carried out for the control process:
1. Indication and input only of those parameters which are absolutely essential (default settings).
2. If required, detailed statements using further masks. Structure of the operator interface (FIG. 2)

The interface is subdivided into a number of areas.
a. Field scheme for the supply network as a tree structure (left-hand side of the figure) with main distribution panel, secondary distribution panels, loads
b. Display area (right-hand side of the figure, top). Indication as a function of the processing
   Circuit dimensioning
   Description of the single-pole network map with technical data for the equipment or results from the load distribution/short-circuit calculation
   Selectivity analysis
   Description of the current/time characteristics with setting elements for the protective device and limit values
   Housing definition
   Elevation drawings, field association, dimensions, etc.
c. Message bar (right-hand side of the illustration, bottom), with a display of fault messages, dimensioning rules, operating information.

The method can be controlled from any of the three windows of the map layout.

The tree structure (left-hand part of the map) shows not only the field scheme of the network but also the results of the checking function for overload protection, short-circuit protection, maximum permissible voltage drop, protection against electric shock and selectivity via symbols and colors in real time, that is to say with respect to the run time of the program, for any changes. The user sees the effects of his changes immediately.

Structuring of the control process. The characteristics which describe an item of equipment can be viewed and amended in a structured form in three levels:

Level 1: Characteristics of the equipment in the network overview corresponding to FIG. 2,
e.g. cables
   cable length
   number of parallel systems
   cross section of main conductors
   cross section of neutral conductors
   cross section of PE conductors
   designation
e.g. switches
   designation
   rated current
   type Level 2: Characteristics of the circuit dialog field (see the example in FIG. 3)

The circuit dialog field contains the most important characteristics of the equipment, for each item of equipment in the circuit, for viewing and changing.

e.g. Type of connection
   cable
   length
   arrangement
   cross section:
   outer, neutral, PE conductors
   Iz permissible load current
   designation
e.g. Type of switching device
   circuit breaker
   rated current/short-circuit switching capacity
   type of protective device Level 3: Characteristics of the equipment detail dialog (see the example in FIG. 4)

The equipment detail dialog field contains all the characteristics which describe the equipment. All the values may be changed. At the same time, these may be defined for a specific item of equipment from the databank: e.g. Type of connection
   conductor material
   insulating material
   number of parallel systems
   cross section of outer conductors
   cross section of pen conductors
   arrangement of the conductors
   laying type
   reduction factors
   maximum permissible voltage drop on the section
   designation Since the characteristics fields for the equipment are allocated in advance via variable default values in expert systems, the characteristics need be changed only in a small number of circuits in the individual levels. The subdivision into levels makes the illustrations clear (a circuit breaker has more than 17 characteristic values), and considerably reduces the time for the operation.

One major advantage of the configuration method is the structuring of the procedure and of the operation, the preparation of the structure for the characteristics of the equipment used in building technology, and the development of a suitable software structure for the operation of the dimensioning tools, in order to reach a result as quickly as possible.

For the configuration process and for defining the components for a building power supply, the configuration method with a software component or software modules (computation core) is intended to ensure the following:
   Dimensioning of the necessary equipment for the electrical power supply in buildings, such as
      switching and protective devices
      cables, lines, bus-bars, etc.
      transformers, generators
      etc.
   based on the recognized rules of technology (building regulations, installation regulations, etc.)
   Selection of the equipment, with its characteristics that are relevant for the definition and selection processes, from a databank
   Checking
      of the overload and short-circuit protection
      of the protection against electric shock from indirect contact (personnel protection)
      of the maximum permissible voltage drop.

The method is firstly intended to lead to clear financially feasible solutions quickly and without any specific specialist knowledge (expert system) while secondly allowing the specific configuration features for the user on a state-specific basis.

Until now, the supply concept has been produced roughly on the basis of empirical values from proven projects. The load currents, the voltage drop and the short-circuit current load have been calculated either by hand or using network calculation programs. The equipment was then selected, and its reliability checked, from catalogs from the equipment and system manufacturers.

On the one hand, this is time-consuming due to the repeated inputting of data, while on the other hand there is a risk of design errors due to transmission errors as a result of media failure between the individual methods.

Structure of the Electrical Power Supply

The power supply network for a building is subdivided into classes, subclasses and characteristics and methods linked to them.

Examples:
a. Circuits class:
  Feed
  Distribution
  End circuits
a.1 Feed subclass
  Transformer feed
  Generator feed
  Feed
a.2 End circuits subclass
  End circuit with motors
  End circuit with capacitors
  End circuit with plug socket
  End circuit with lights
a.1.1 Transformer feed subclass, e.g.
  Medium-voltage section
  Medium-voltage cable
  Transformer
  Transformer switch
  Low-voltage cable
  Distribution panel feed switch
a.1.1.1 Transformer characteristics
  Rated power
  Type
  Rated short-circuit voltage
  Power loss
  Transformation ratio
  etc.
a.1.1.1 Methods
  These include the methods according to 1.1.2
The standard elements as shown in FIG. 1 are used for this purpose. Individual configuration steps, calculation methods and characteristics can thus be associated uniquely. State-specific and user-defined default values allow technical data for the configuration process and for the selection of equipment to be determined in advance as a function of the class.

Procedure for calculation using the configuration program/tool:

In order to reduce the calculation loops for carrying out the configuration process to the absolutely essential extent, the following configuration sequence has been defined:
1. Configuration of the overload protection
2. Configuration of the short-circuit protection
3. Configuration of the protection against electric shock
4. Configuration of the voltage drop
5. Configuration of the selective response of the protective device (see item 3)

This specific procedure leads to "forward configuration" which in principle, by way of example, leads only to larger cable and line cross sections. This avoids unnecessary loops in the configuration process, thus in principle resulting in the financially best solution.

The individual configuration steps are based on the currently applicable and recognized rules of technology. State-specific settings allow footnotes that are normal for a given state to be taken into account in the configuration rules.

Type of Calculation

The individual circuit classes are dimensioned on the basis of the recognized rules of technology, such as national and international Standards, regulations and installation regulations. The necessary equipment, such as switching devices, cables etc. are defined using an expert system on the basis of default values, which can be matched to the requirements of the respective planner, as well as selection rules for the equipment (fuzzy logic). This leads to the minimum time being consumed for feasible solutions. If necessary, each circuit can be matched to the presets of the user of the software, by manual setting. It is thus likewise possible to take into account the user's personal foibles.

A databank in which all the products with the characteristics required for an automatic program are stored is used to ensure that only deliverable products are taken into account in the dimensioning process. Three dimensioning methods are available for this purpose:

a. Power budget
  The power requirement for a building is in principle calculated using the bottom-up method, that is to say from the end loads to the feed into the building. In order to obtain an energy budget for a building very quickly in this case, the supply structure of a building can be entered with the data that is important to the power budget, such as the real power, wattless component, number of poles, rated voltage, simultaneity factor (distribution panels) or utilization factor (loads), and the preset default values can be amended. The power budget is then calculated in real time, that is to say during the run time of the program in the event of changes and inputs. No inputs or additions are made to the switching and protection functions or to the transmission paths. This can be reconfigured at a later time. (see item b or c)

b. Automatic dimensioning
  The program is set to "automatic dimensioning" as a default value. This means that, once the supply task has been entered, the program automatically dimensions the required switching and protective devices, the required cable and bus-bar connections using the top-down method (from the feed to the load). The equipment is selected from the databank using the selection method that is dependent on the circuit and its characteristics.

A power budget as in item a, a load distribution calculation and a short-circuit calculation are produced for both the maximum and minimum short-circuit loads automatically, in parallel with the run time, for each input or change.

The checking module is used to check the 5 conditions for design of the circuit in accordance with the regulations. The result is shown in the tree structure of the network (green=check satisfactory; red=at least one check is not satisfactory or the dimensioning is incorrect because, for example, it has not been possible to define any suitable protective device).

c. Non-automatic dimensioning

If the user changes a characteristic for the equipment or defines a new item of equipment with new characteristics from the databank, an automatic change is made for this equipment from "automatic dimensioning" to "dimensioning by hand" (blue hand at the corresponding nodes for the distribution panel, feed, load in the tree structure and in the circuit dialog field for equipment).

In this case, no new equipment is defined, and the calculation and check are carried out using the equipment as set by the user, based on the top-down method (from the feed to the load). The result display—all conditions satisfied or not satisfied—is present using the tree structure, as in item b.

An object of the program is to automatically dimension an economic installation and to select the required equipment in a very short time. For this reason, manufacturer's details which lead to more economic dimensioning of equipment are evaluated in the calculation method. This includes, for example, the current-limiting effect of current-limiting circuit breakers, miniature circuit breaks and fuses in the event of short-circuit currents. For this purpose, the let-through power characteristics and the let-through current characteristics for this equipment have been digitized, and have been stored in the databank using a specific method.

This method leads to more economical design of the equipment, in particular for cables and lines, and hence to a significant reduction in the fire hazard loading in the building, due to the reduction in the cable insulation (e.g. PVC) when laying smaller cable cross sections.

The voltage drop in the individual circuits is calculated using the currently applicable rules of technology. For practical matching of the calculation results, the equipment temperature can be matched to the actual conditions.

A further advantage of the present idea is the fact that suitable software algorithms have been developed for mapping the individual circuit classes, equipment classes, their characteristics, the calculation and design methods for power supply systems in the form of sections, as well as their combination as a function of the existing standards and installation regulations. Furthermore, the nature of data maintenance for the equipment, the preparation and digitization of the tripping characteristics, of the let-through power characteristics, of the let-through current characteristics of the switching and protective devices, such as open circuit breakers, current-limiting circuit breakers, miniature circuit breakers, fuses, fused switch disconnectors, residual current devices, etc. as well as the preparation of the current load capacity tables and impedance tables should be regarded as an inventive step.

Only the specific form of data conditioning and the software algorithms that have been developed ensure a. separation of data storage and the program, b. a solution which, economically, can be implemented well for the electrical power supply in buildings. Both lead to considerable shortening of the configuration time required, and to avoidance of configuration errors.

Figure 6:
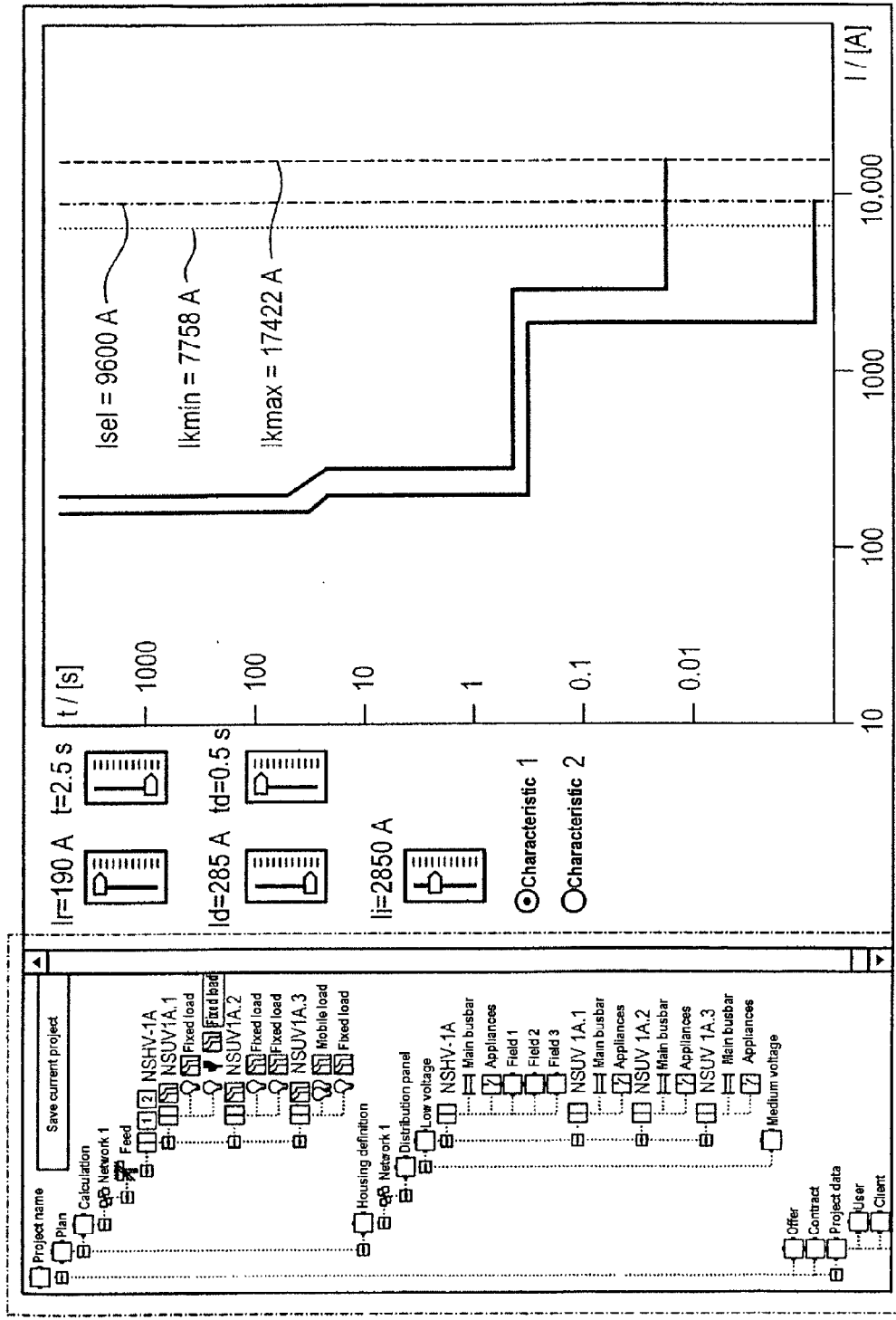
FIGS. 6, and 6A and 7 and 7A show screen displays for tripping characteristics.
Figure 6A:
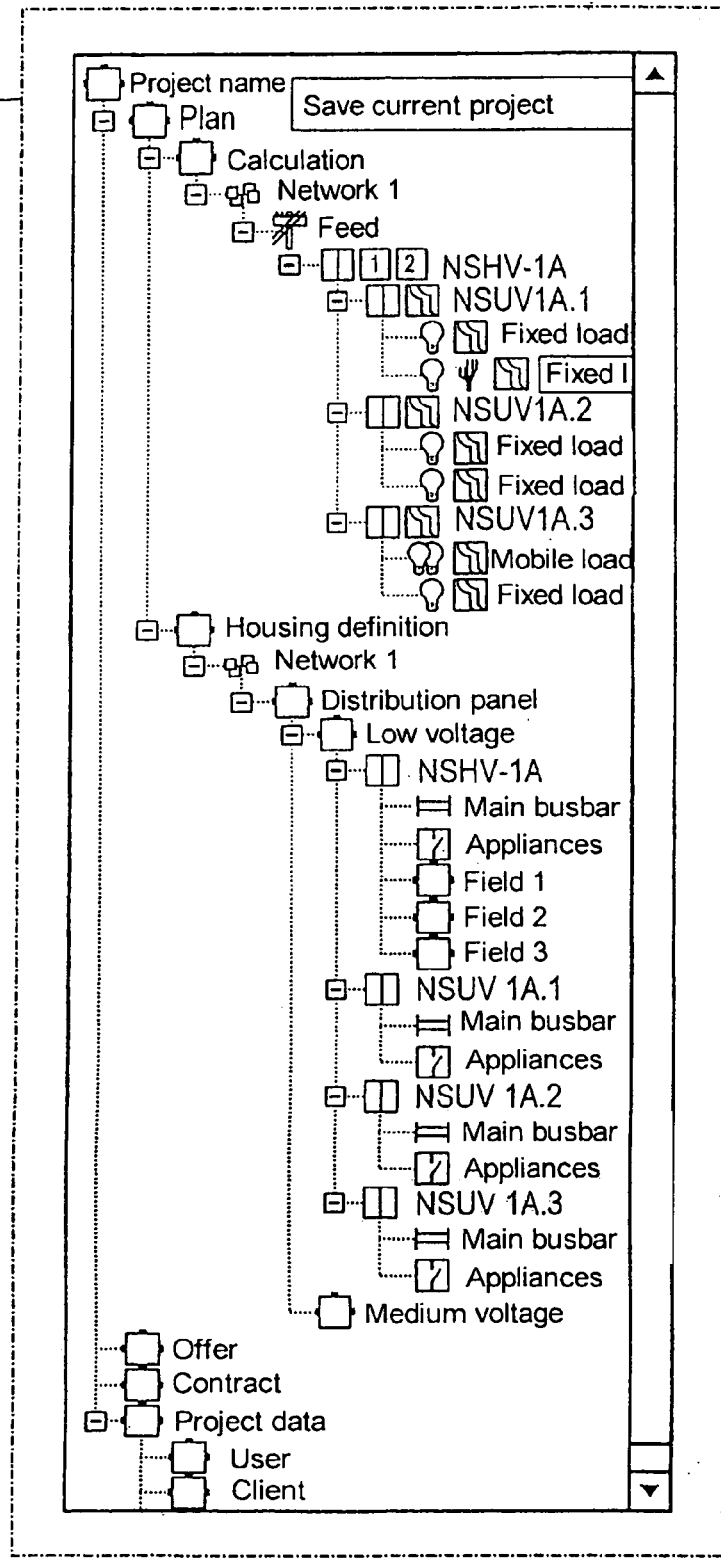
Figure 7:
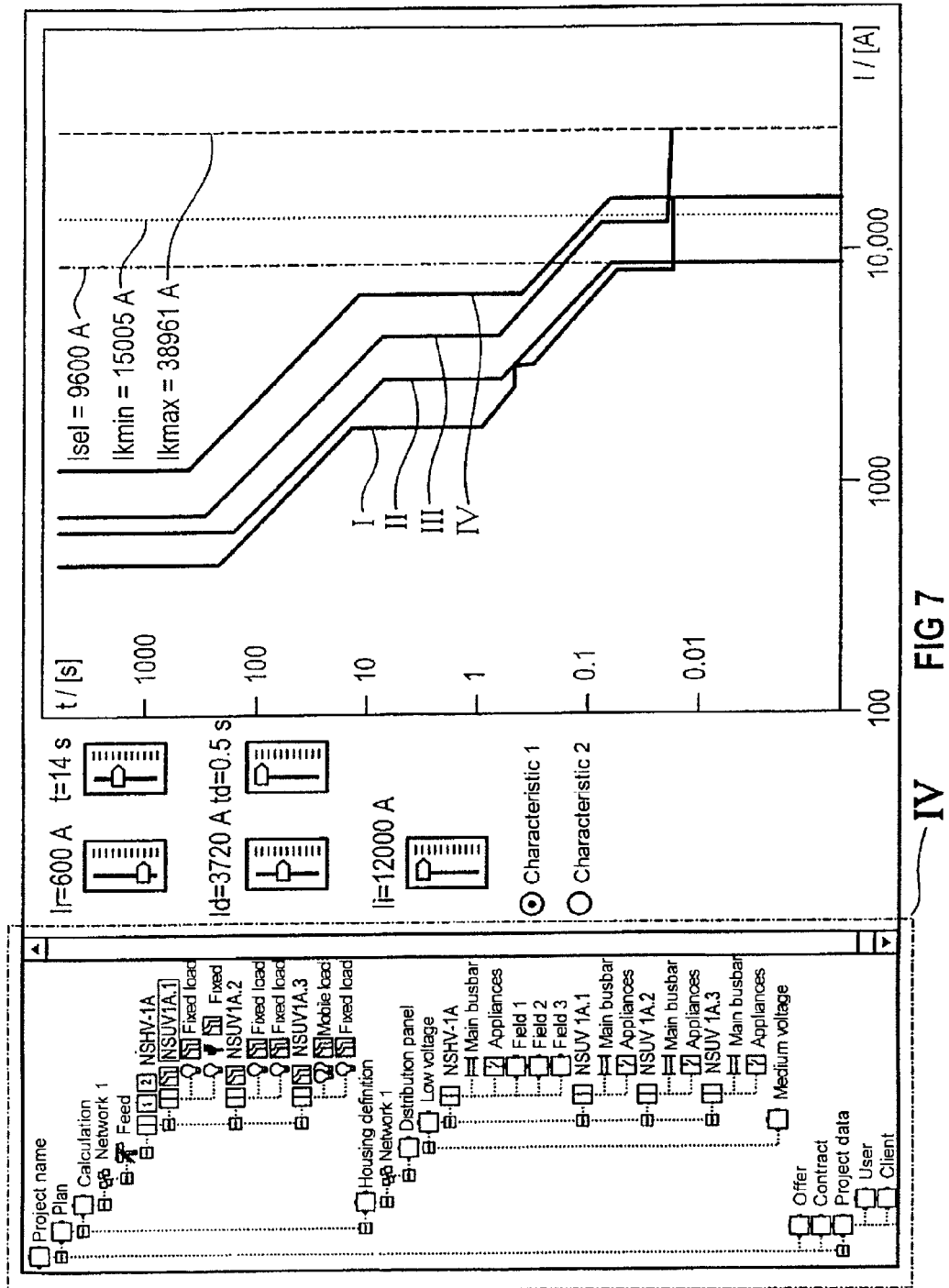
Figure 7A:
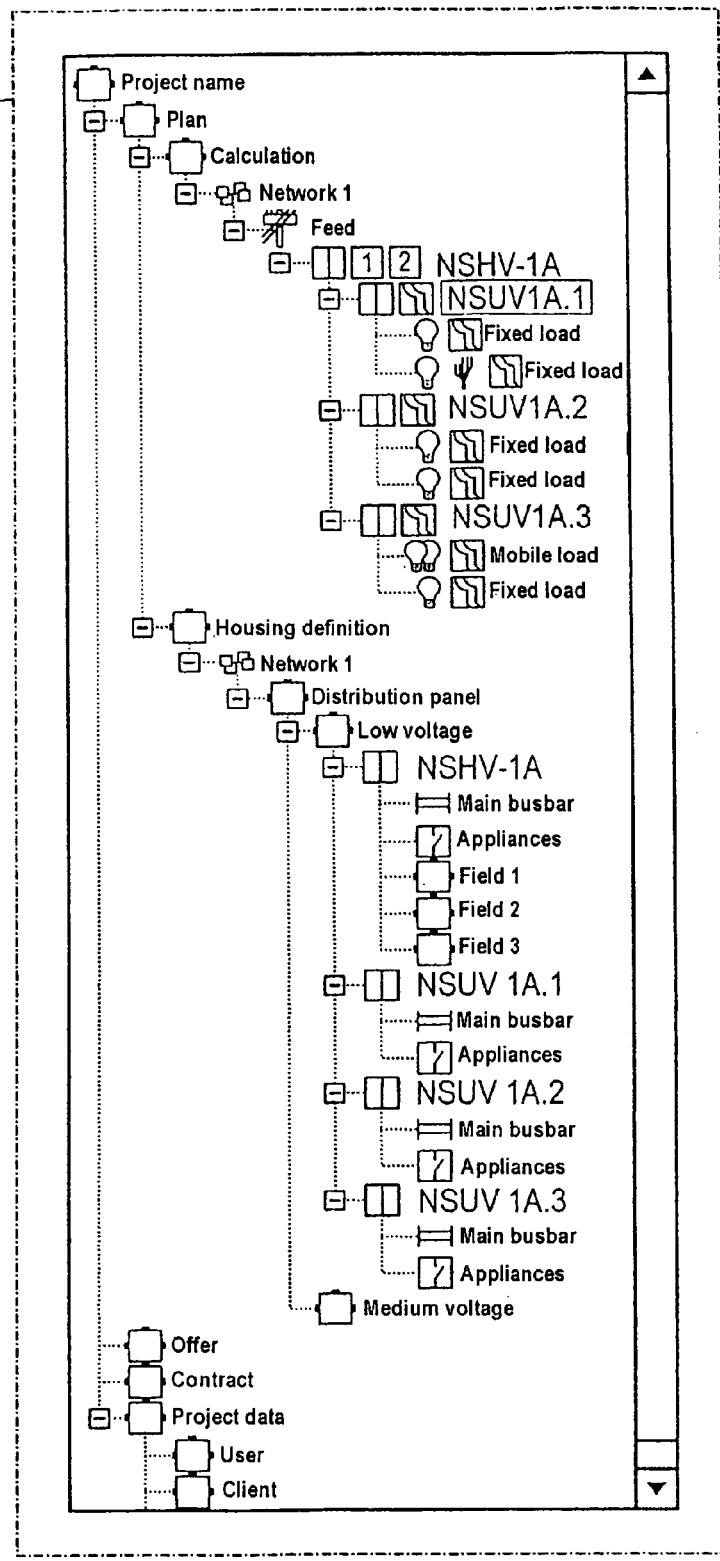

Selectivity Analysis (FIGS. 6 and 7)

The selective response of overload and short-circuit protective devices must be verified for the electrical power supply in buildings. When essential safety devices in a building are supplied, such as emergency lighting, fire service elevators, fire extinguishing water pumps, etc., the national, European and international installation and building regulations mean that there is actually a verification obligation. However, if the switching and protective devices in a circuit are changed in order to achieve a selective response, then this has an influence on the other equipment in a circuit, such as cables, lines, bus-bars, etc.

Until now, the selectivity verification has been produced either by drawing illustrations of the mean current/time characteristics (FIGS. 6 and 7) for the switching and protective devices on log-log paper for the tripping time range of more than 100 ms, or by evaluation of selectivity limit value tables from manufacturers. This takes a very long time since each upstream or downstream switching or protective device combination (considering two devices in each case) must be described and assessed. The use of modern software programs which transfer the drawing representation to log-log paper does not reduce the complexity very much either, since there is no direct link to the calculation programs for short circuits and load flow.

The program automatically specifies the circuit tree, with the switching and protective devices that are used. It takes the relevant network data from the circuit dimensioning in order to define the correct protective setting, and represents this in a current/time diagram (see the examples in FIGS. 6 and 7).

On the basis of the setting data for the individual characteristic sections (overload, short-time delayed and undelayed) as well as the upper and lower tolerance bands specified by the manufacturer (from the databank), the program composes the tolerance band for the protective tripping of the respective protective device automatically, on its own. Intersections of the characteristics of upstream and downstream switching and protective devices calculated automatically by the program determine the selectivity limit. If the selectivity limit is in the "undelayed" range (short-circuit quick-action release), the selectivity limit value tables from the manufacturer are also used to define the selectivity limits.

The setting values determined by the program can be changed by the user. To this end, the actual setting steps of the individual switching and protective devices are stored in the databank. The setting process is then carried out in the central part of the map, using so-called soft buttons.

At the same time, overall tolerance bands for the upstream and downstream protective devices are displayed in the current/time diagram. It is thus possible to see directly whether the outgoer under consideration has a selective response, without needing to consider every possible combination of switching and protective devices individually.

If setting data has been selected which would lead to the equipment that is being used being unacceptably highly loaded either in the event of a maximum load on the circuit or in the event of a short circuit, or to the expectation of spurious tripping, this is thus indicated immediately during the run time as "RED".

This method provides the engineer with the following advantages:

considerably shorter configuration time (time and cost advantage)

more accurate result since the processing is carried out with actual possible setting steps influence on the selection of the equipment, such as cables, lines, etc. and on the selectivity being indicated directly and automatically error messages and fault messages are automatically transferred to the network calculation.

The use of this tool ensures that a selective response by the protective devices is guaranteed, with a greatly reduced, acceptable level of effort. This leads in the end to safer power supply installations for building technology, as well.

A further advantage of the method is the use of suitable software algorithms and method sections for production of the correct tolerance-dependent tripping curves production of the total tolerance tripping curves for a number of upstream and downstream switching and protective devices calculation of the correct intersections of the tripping curves.

Appropriate data storage guarantees the above functionality, with the selectivity and partial selectivity being monitored during the program run time. Changes are processed online.

Figure 5:
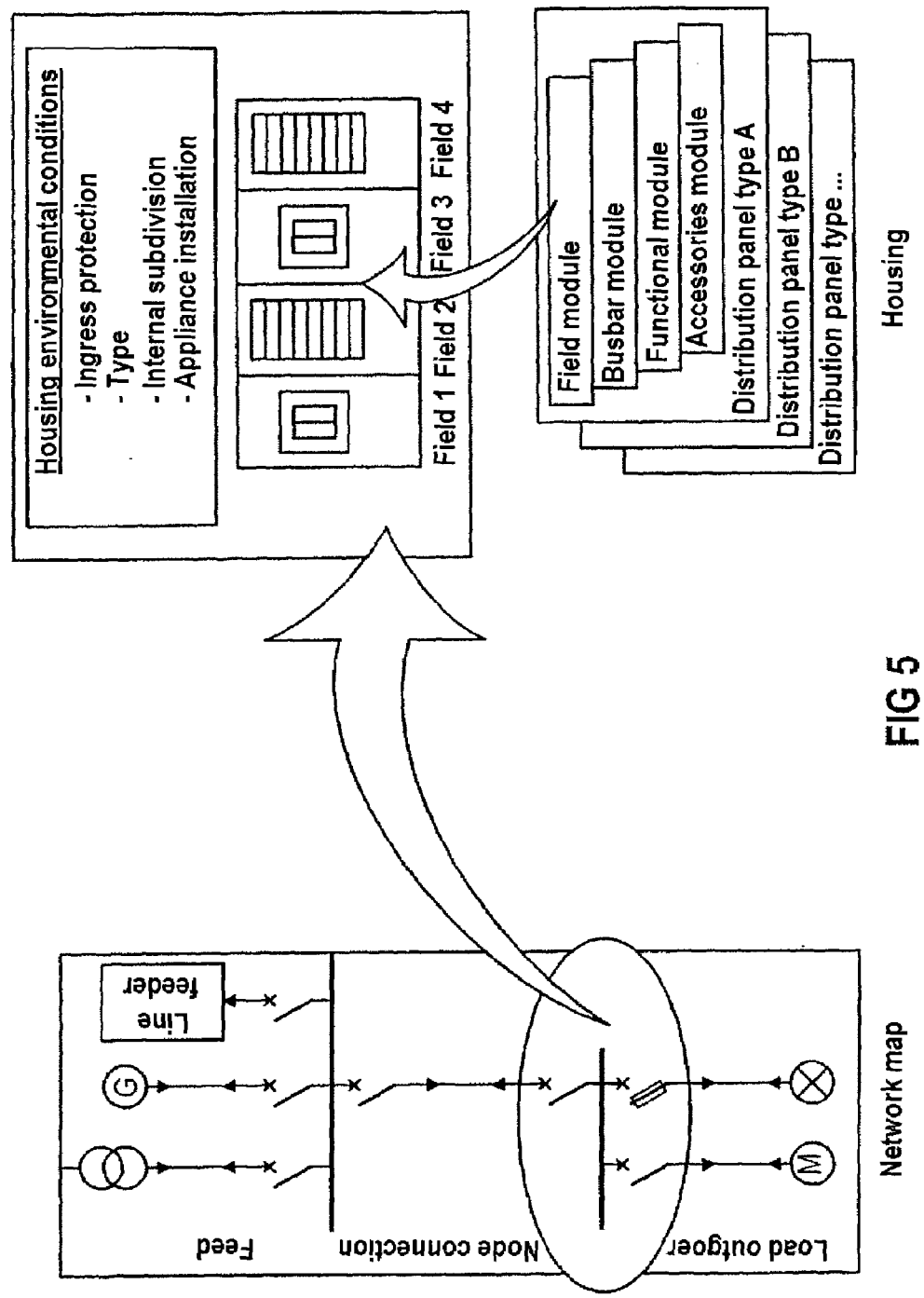
FIG. 5 shows an illustration for housing definition.

Building Definition (in this Context, See FIG. 5)

Those planning electrical power supply installations for buildings need to know the details for the space requirement for distribution panels, transformers, generators and power transmission runs at a very early planning stage. Generally, they do not have specific knowledge relating to the construction of distribution installations, heating problems in specific distribution panels, etc.

One object in this case is to obtain details relating to the distribution panels, governing their size, their weight and the procurement costs as a function of the desired characteristics of the distribution panels, and the space required.

In general, the configuration process has until now made use of existing installations or installation parts of projects that have been completed. This is done by storing and evaluating typical exemplary embodiments in hard-copy form or in the form of DXF graphics, for example.

This leads to a long time being required, since the necessary fields must be looked for, and if necessary modified, depending on the specific equipment. Furthermore, a configuration process such as this can be carried out only by specialists.

Structuring has been carried out here, in a similar way to that for the definition of the equipment, in order that:

1. the operation can be carried out easily (always using the same scheme), and 2. different distribution panels can be defined as automatically as possible.

The equipment (switching and protective devices) from the dimensioning of the circuits is transferred, including its characteristics, to the building definition. The functional modules for the installation of the switching and protective devices are determined from the distribution panel databank. All distribution panels which have a functional module for the switching and protective devices are automatically made available for selection, together with their characteristics.

By restricting the permissible characteristics such as protection class, color, type of internal subdivision, etc., it is possible to restrict the distribution panels which can be selected. The user is thus provided with a tool which allows him to define that distribution panel which satisfies his requirements, in a very short time, on the basis of general distribution panel characteristics.

A front view and plan view of the distribution panel is produced automatically, and is available for further use, for example in CAD programs. A general description of the distribution panels, of the switching and protective devices to be installed, and an estimated price are determined at the same time.

The definition process takes account of the fact that the switching and protective devices have only a reduced current carrying capacity after installation in a distribution panel. This leads to adequate definition of the switching and protective devices.

The core advantage of the new method with regard to building definition is the development of classes, subclasses, etc. which can be described by characteristics which can be understood by a planner or installer of a switchgear assembly. This is assisted by the use of selection algorithms which associate the switching and protective devices, as defined by the dimensioning tool of the method, with a specific section and installation type, via their characteristics such as the rated current, load current, number of poles, short-circuit connection capacity, type of drive, type of installation, etc.

The individually described method steps and details of the new method of the apparatus, which is in the form of a PC, may, of course, be combined with one another without departing from the fundamental essence of the present idea. The essential feature in this case is that the previously complex configuration process for installations, which was not necessarily systematic can now be carried out automatically, with a high level of user-friendliness.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for configuring an electrical installation having a network which extends from a feed side to a load side, comprising:

determining a network map by at least one of,
    determining a feed circuit based upon presets for at least one electrical device, available power and circuit length, and determining a load circuit based upon presets for an intended load and the circuit length, and determining a load circuit based upon presets for an intended load and the circuit length, determining a feed circuit based upon the circuit length, and using the results from algorithms and the presets for the load circuit, wherein the feed circuit and the load circuit are coupled to a virtual interface, wherein the following steps are carried out for each circuit, and for at least one of parallel branches in the feed circuit and in the load circuit, based on the sum of the loads as far as the circuit under consideration:

a) determining at least one of devices and protective measures for obtaining overload safety on the basis of the total load and predetermined tables and algorithms, and on the basis of selection tables for establishing suitable appliances;

b) determining at least one of devices and protective measures for obtaining short-circuit protection for short-circuit currents which are obtained on the basis of algorithms from the results according to a);

c) determining at least one of devices and measures for protection of life against electric shocks in the case of indirect contact, on the basis of the results from a) and b) and on the basis of tables and/or of algorithms, d) determining at least one of power cross section and of parallel conductors on the basis of the assessment of cable lengths on the basis of the results according to a) to c) from a cable point under consideration to a load under consideration using the consideration measure that a voltage for correct operation of the load is present across the load, on the basis of the voltage drop, e) determining, for the situation where two or more protective devices are provided in series, devices which have a selective response with respect to one another, on the basis of the results according to a) to d) and on the basis of selection tables, if the protective switching devices have not satisfied the selectivity requirements, f) producing the network map on the basis of the accumulated results according to a) to e).

2. The method as claimed in claim 1, wherein a secondary distribution panel is connected in-between at the virtual interface, with an input for the circuit length of the secondary distribution panel being provided for at least one of the presets and the results relating to the feed circuit.

3. The method as claimed in claim 2, wherein the network map is visualized in the form of a tree structure.

4. A configuration apparatus for carrying out the method as claimed in claim 2, comprising:
- a computer;
- a display;
- an input device;
- a memory, in which a plurality of virtual devices, appliances and protective devices are stored with their characteristic data in tables; and
- a generator which uses the determined devices, appliances and protective devices to produce the network map.

5. The method as claimed in claim 1, further comprising: producing an envelope curve for protective devices which are connected in series upstream or downstream of at least two parallel-arranged protective devices, around the tripping curves of the parallel-arranged protective devices, wherein these curves are visualized.

6. The method as claimed in claim 5, wherein setting parameters for the protective devices are changed on the basis of values which can be predetermined, and wherein the resultant tripping curves are visualized online.

7. The method as claimed in claim 6, wherein the setting parameters for the protective devices are produced at an interface for an output to the respective protective devices.

8. The method as claimed in claim 6, wherein the network map is visualized in the form of a tree structure.

9. The method as claimed in claim 7, wherein the network map is visualized in the form of a tree structure.

10. The method as claimed in claim 5, wherein the network map is visualized in the form of a tree structure.

11. A configuration apparatus for carrying out the method as claimed in claim 5, comprising:
- a computer;
- a display;
- an input device;
- a memory, in which a plurality of virtual devices, appliances and protective devices are stored with their characteristic data in tables; and
- a generator which uses the determined devices, appliances and protective devices to produce the network map.

12. The method as claimed in claim 1, wherein, in order to obtain housings for secondary distribution panels for accommodating determined appliances and devices, space is subdivided into space for
- main connecting rails,
- accessories,
- functional modules for each appliance, comprising an installation kit, in order to allow a specific appliance to be installed, with terminals and intermediate rails, and
- the housing.

13. The method as claimed in claim 12, wherein, for determined appliances and devices, the associated determined space is split into fields in the form of at least one of distribution panels and switchgear cabinets.

14. A configuration apparatus for carrying out the method as claimed in claim 12, comprising:
- a computer;
- a display;
- an input device;
- a memory, in which a plurality of virtual devices, appliances and protective devices are stored with their characteristic data in tables; and
- a generator which uses the determined devices, appliances and protective devices to produce the network map.

15. A configuration apparatus for carrying out the method as claimed in claim 13, comprising:
- a computer;
- a display;
- an input device;
- a memory, in which a plurality of virtual devices, appliances and protective devices are stored with their characteristic data in tables; and
- a generator which uses the determined devices, appliances and protective devices to produce the network map.

16. The method as claimed in claim 1, wherein the network map is visualized in the form of a tree structure.

17. A configuration apparatus for carrying out the method as claimed in claim 1, comprising:
- a computer;
- a display;
- an input device;
- a memory, in which a plurality of virtual devices, appliances and protective devices are stored with their characteristic data in tables; and
- a generator which uses the determined devices, appliances and protective devices to produce the network map.

* * * * *